United States Patent
Zhang

(10) Patent No.: US 9,739,067 B2
(45) Date of Patent: Aug. 22, 2017

(54) LIGHTWEIGHT ENVIRONMENT-FRIENDLY POLYPROPYLENE COMPOSITE FLOOR AND PREPARATION PROCESS THEREOF

(71) Applicant: XINMING (LUTAI) TECHNOLOGY CO., LTD., Tianjin (CN)

(72) Inventor: Mingqi Zhang, Tianjin (CN)

(73) Assignee: MING HE (LUTAI) TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 15/169,458

(22) Filed: May 31, 2016

(65) Prior Publication Data

US 2017/0022388 A1   Jan. 26, 2017

(30) Foreign Application Priority Data

Jul. 24, 2015  (CN) ............. PCT/CN2015/085055

(51) Int. Cl.
*E04F 15/10* (2006.01)
*B32B 27/08* (2006.01)
(Continued)

(52) U.S. Cl.
CPC ............. *E04F 15/107* (2013.01); *B29B 7/48* (2013.01); *B29B 11/12* (2013.01); *B29B 13/04* (2013.01);
(Continued)

(58) Field of Classification Search
CPC ....... C08L 23/12; E04F 15/107; E04F 15/102; E04F 15/105; E04F 15/02; B32B 27/08; B32B 27/06; B32B 27/32; B32B 2255/10; B32B 2323/10; B32B 2262/101; B32B 2307/554; B32B 2471/00; B32B 2419/04; C08F 2500/12; C08K 3/34; C08K 3/36; C08K 3/40; B82Y 30/00; B29B 7/48; B29C 59/02; B29C 65/20; B29C 66/45
See application file for complete search history.

(56) References Cited

U.S. PATENT DOCUMENTS

| 3,607,473 A * | 9/1971 | Grunwald ................ C08J 7/02 |
| | | 216/83 |
| 2002/0086932 A1* | 7/2002 | Kuo ....................... C08K 3/34 |
| | | 524/442 |

(Continued)

FOREIGN PATENT DOCUMENTS

| CN | 1754692 A | 4/2006 |
| CN | 102020808 A | 4/2011 |

(Continued)

OTHER PUBLICATIONS

"Ethyl Acetate boiling point", SciFinder, Nov. 29, 2016.*

(Continued)

*Primary Examiner* — Aaron Austin
*Assistant Examiner* — Jasper Saberi
(74) *Attorney, Agent, or Firm* — Rothwell, Figg, Ernst & Manbeck, P.C.

(57) ABSTRACT

The present invention provides is a lightweight environment-friendly polypropylene composite floor comprising, from top to bottom: 1) a scratch-resistant coating layer, 2) a super-transparent wear-resistant layer, 3) a decorative layer, 4) a first substrate layer, 5) a second substrate layer, 6) a bottom connective layer, and optionally 7) a back adhesive layer. Also provided is a preparation process of the composite floor.

16 Claims, 1 Drawing Sheet

(51) Int. Cl.

| | | |
|---|---|---|
| *B32B 27/32* | (2006.01) | |
| *B29B 7/48* | (2006.01) | |
| *B29B 11/12* | (2006.01) | |
| *B29B 13/04* | (2006.01) | |
| *B29C 59/02* | (2006.01) | |
| *B29C 65/20* | (2006.01) | |
| *B29C 65/48* | (2006.01) | |
| *B29C 65/00* | (2006.01) | |
| *C08L 23/06* | (2006.01) | |
| *C08L 23/12* | (2006.01) | |
| *B32B 27/06* | (2006.01) | |
| *B29K 23/00* | (2006.01) | |
| *B29K 75/00* | (2006.01) | |
| *B29L 31/10* | (2006.01) | |

(52) U.S. Cl.
CPC .............. *B29C 59/02* (2013.01); *B29C 65/20* (2013.01); *B29C 65/4815* (2013.01); *B29C 66/45* (2013.01); *B32B 27/08* (2013.01); *B32B 27/32* (2013.01); *C08L 23/06* (2013.01); *C08L 23/12* (2013.01); *B29K 2023/06* (2013.01); *B29K 2023/12* (2013.01); *B29K 2075/00* (2013.01); *B29K 2995/0026* (2013.01); *B29K 2995/0087* (2013.01); *B29L 2031/10* (2013.01); *B32B 27/06* (2013.01); *B32B 2307/554* (2013.01); *B32B 2323/10* (2013.01); *B32B 2471/00* (2013.01); *C08F 2500/12* (2013.01)

(56) References Cited

U.S. PATENT DOCUMENTS

| | | | | |
|---|---|---|---|---|
| 2005/0192385 | A1* | 9/2005 | Zingg | ................. C08K 3/0058 524/100 |
| 2006/0141277 | A1* | 6/2006 | Forget | ................... B32B 27/32 428/516 |
| 2008/0050598 | A1* | 2/2008 | Bateman | ............... B05D 3/107 428/426 |
| 2008/0206583 | A1* | 8/2008 | Phan | ........................ B32B 7/12 428/523 |
| 2011/0020629 | A1* | 1/2011 | Mussig | ................... B29C 55/06 428/299.1 |
| 2011/0045284 | A1* | 2/2011 | Matsukawa | ........ B29C 45/1418 428/336 |
| 2011/0236708 | A1* | 9/2011 | Oysaed | ............... B29C 49/0005 428/516 |
| 2011/0268933 | A1 | 11/2011 | Hahn et al. | |
| 2011/0301265 | A1* | 12/2011 | Brunner | .................. C08L 51/06 524/91 |
| 2013/0116374 | A1* | 5/2013 | Schillo | ................... C08F 285/00 524/504 |
| 2014/0227475 | A1* | 8/2014 | Yu | ...................... E04F 15/02155 428/86 |
| 2014/0264201 | A1* | 9/2014 | Bouvy | ................... B82Y 30/00 252/587 |
| 2016/0340916 | A1* | 11/2016 | Wright | ................. E04F 15/105 |

FOREIGN PATENT DOCUMENTS

| | | |
|---|---|---|
| CN | 102277945 A | 12/2011 |
| JP | 2001220886 A | 8/2001 |

OTHER PUBLICATIONS

"Turpentine boiling point", http://www.chemicalbook.com/ProductMSDSDetailCB4380009_EN.htm, Nov. 26, 2009.*

International Search Report dated Jul. 24, 2015, PCT/CN2015/085055, partially translated, 5 pages.

* cited by examiner

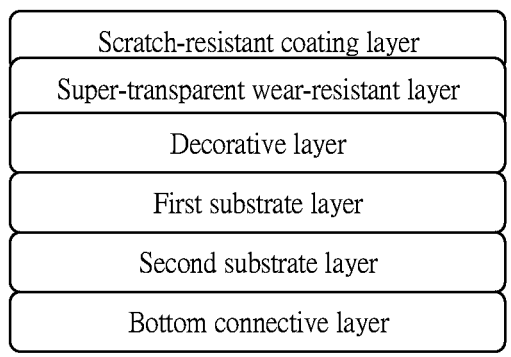

LIGHTWEIGHT ENVIRONMENT-FRIENDLY POLYPROPYLENE COMPOSITE FLOOR AND PREPARATION PROCESS THEREOF

TECHNICAL FIELD

The present invention relates to a composite floor. Particularly, the present invention relates to a polypropylene-based composite floor, and its preparation process.

TECHNICAL BACKGROUND

Traditional composite floors are mostly based on polyvinyl chloride (PVC). However, a PVC-based floor has disadvantages in view of environment protection. For example, PVC-based floors may release toxic gases such as hydrogen chloride, carbon monoxide, and dioxin upon decomposition or combustion, and they usually contain phthalate plasticizers, which may produce reproductive toxicity when separated out. Moreover, PVC-based floors have poor dimensional stability.

Therefore, efforts have been made to look for an alternative composite floor material to replace PVC and some non-PVC-based floors have been developed. For example, Shaw Industries Group Corporation (Shaw) developed some non-PVC-based composite floors containing polyethylene, ethylene-propylene rubber and/or ethylene-butyl acrylate copolymer as substrate materials; Kangge Haslem Company (Congoleum) also developed some composite floors containing ethylene-methyl acrylate-acrylic acid terpolymer and/or ethylene-methyl acrylate copolymer as substrate materials.

CN102277945A discloses a non-PVC-based composite floor containing polyethylene, ethylene-propylene rubber and/or ethylene-butyl acrylate copolymer as the substrate layer, which solved the environmental problem and plasticizer separating-out problem of a PVC-based floor. The structure of the composite floor comprises, from top to bottom, a wear-resistant layer, a connective layer, a decorative layer, optionally another connective layer, a primary substrate layer, and a secondary substrate layer. However, this patent application document does not disclose how to solve the following problems that may be present in this kind of non-PVC composite floors:

(A) poor transparency of the wear-resistant layer;
(B) poor dimensional stability of the floor;
(C) poor scratch-resistance of the surface of the floor;
(D) poor compactness between the floor and the ground;
(E) poor compactness between the wear-resistant layer and the decorative layer;
(F) poor compactness between the decorative layer and the substrate layer; and
(G) using an extrusion process or multilayer co-extrusion process or casting process, which has low production capacity & production efficiency, and the product cost is considerably high.

Accordingly, there has been a need to find better structural materials for non-PVC-based composite floors and their preparation processes in order to overcome the deficiencies of the prior art and to obtain an ideal composite floor.

CONTENT OF THE INVENTION

An object of the present invention is to provide a lightweight environment-friendly composite floor, which adopts light density polypropylene material to replace traditional PVC material as a substrate material, and comprises, from top to bottom, a scratch-resistant layer, a wear-resistant layer, a decorative layer, a first substrate layer, a second substrate layer, a bottom connective layer and, optionally, a back adhesive layer.

In the composite floor of the present invention, the wear-resistant layer has a super transparency, and there is excellent compactness between each layer and its neighboring layer without using additional connective layer, and the compactness between the composite floor and the ground is also excellent. The composite floor also has good dimensional stability, high mechanical strength, good resistance to shrinkage and warpage, and good flame retardance.

The above object of the present invention is achieved by providing a composite floor comprising, from top to bottom:

1) a scratch-resistant coating layer, which is formed from a polyurethane-based coating;

2) a super-transparent wear-resistant layer, which is formed from raw materials comprising polypropylene and a nucleating agent, and has a haze of less than 11% and a light transmittance of greater than 90%;

3) a decorative layer, which is a layer of ink-printed environment-friendly composite paper or a layer formed through a thermal transfer process:

4) a first substrate layer comprising a polypropylene blend consisting of a first polypropylene having a melt index of 0.1-0.9 g/10 min and a second polypropylene having a melt index of 5-30 g/10 min. a polyethylene having a melt index of 2-20 g/10 min, glass fiber with a length of 0.4-0.8 mm, an ethylene-octene copolymer, wollastonite powder, calcium carbonate powder and a flame retardant, wherein, based on the total weight of the first substrate layer, the weight percentage of the polypropylene blend is represented by "wt % pp", the weight percentage of the polyethylene is represented by "wt % pe", the average melt index of the polypropylene blend is represented by "MIpp", the melt index of the polyethylene is represented by "MIpe", and $$Rm = (MIpp \times wt\% \, pp)/(MIpe \times wt\% \, pe),$$

then Rm satisfies $1 < Rm < 10$;

5) a second substrate layer comprising a polypropylene blend consisting of a first polypropylene having a melt index of 0.1-0.9 g/10 min and a second polypropylene having a melt index of 5-30 g/10 min. a polyethylene having a melt index of 2-20 g/10 min. glass fiber with a length of 0.4-0.8 mm, an ethylene-octene copolymer, wollastonite powder, calcium carbonate powder and a flame retardant, wherein, based on the total weight of the second substrate layer, the weight percentage of the polypropylene blend is represented by "wt % pp", the weight percentage of the polyethylene is represented by "wt % pe", the average melt index of the polypropylene blend is represented by "MIpp", the melt index of the polyethylene is represented by "MIpe", and $$Rm = (MIpp \times wt\% \, pp)/(MIpe \times wt\% \, pe),$$

then Rm satisfies $0.2 < Rm < 1$;

6) a bottom connective layer formed from a polypropylene-based material and having a rough surface formed by embossing; and optionally 7) a back adhesive layer, which is a hot melt adhesive layer applied on the bottom surface of the bottom connective layer.

In a preferred embodiment of the composite floor of the present invention, the upper surface of the super-transparent wear-resistant layer, which is facing the scratch-resistant coating layer, has been subjected to a surface-polarizing treatment.

In a preferred embodiment of the composite floor of the present invention, the upper surface of the ultra-transparent wear-resistant layer has been subjected to a surface-polarizing treatment by using the following treatment agent A and treatment agent B:

Treatment agent A comprises:
  20-40% by weight of turpentine,
  20-40% by weight of ethyl acetate,
  20-30% by weight of a surfactant, and
  2-10% by weight of an emulsifier.
Treatment agent B comprises:
  0.5-1% by weight of $KMnO_4$, and
  99-99.5% by weight of deionized water.

In a preferred embodiment of the composite floor of the present invention, the super-transparent wear-resistant layer has a raw material formulation comprising: based on the weight of the total formulation,
  85-98% by weight of a polypropylene having a molecular weight of 100,000 to 300,000.
  1-12% by weight of a grafted copolymer of propylene and maleic anhydride having a molecular weight of 20,000 to 50,000, wherein the grafting rate of maleic anhydride is 1-10%,
  0.2-0.8% by weight of a nucleating agent,
  0.1-0.5% by weight of an antioxidant,
  0.2-0.8% by weight of an ultraviolet light absorber, and
  0.2-0.5% by weight of a light stabilizer.

In a preferred embodiment of the composite floor of the present invention, the decorative layer is an ink-printed silicon-based environment-friendly composite paper, wherein the environment-friendly composite paper has a raw material formulation comprising: based on the weight of the total formulation,
  10-30% by weight of silicon-based nano powder with a particle diameter of 10-100 nm;
  1-5% by weight of a polyelectrolyte dispersant,
  20-25% by weight of a polyethylene having a molecular weight of about 100,000 to 300,000.
  10-20% by weight of a polypropylene having a molecular weight of about 200,000-400,000,
  40-50% by weight of an inorganic mineral powder filler.
  1-3% by weight of a lubricant, and
  1-2% by weight of an antistatic agent.

In a preferred embodiment of the composite floor of the present invention, the first substrate layer has a raw material formulation comprising, based on the weight of the total formulation,
  1) 0.5-10% by weight of a first polypropylene having a melt index of 0.1-0.9 g/10 min,
  2) 0.5-10% by weight of a second polypropylene having a melt index of 5-30 g/10 min,
  3) 1-10% by weight of a polyethylene having a melt index of 2-20 g/10 min,
  4) 1-5% by weight of long glass fiber with a length of 0.4 mm-0.8 mm.
  5) 0.5 to 2% by weight of an ethylene-octene copolymer,
  6) 2-5% by weight of wollastonite powder,
  7) 60-85% by weight of calcium carbonate powder, and
  8) 1-6% by weight of an intumescent flame retardant, wherein
  the amounts of the first polypropylene, the second polypropylene, and the polyethylene are selected, so that the value of Rm as defined above of the first substrate layer satisfies 1<Rm<10.

In a preferred embodiment of the composite floor of the present invention, the second substrate layer has a raw material formulation comprising: based on the weight of the total formulation,
  1) 0.5 to 10% by weight of a first polypropylene having a melt index of 0.1-0.9 g/10 min, and
  2) 0.5-10% by weight of a second polypropylene having a melt index of 5-30 g/10 min.
  3) 1-10% by weight of a polyethylene having a melt index of 2-20 g/10 min. and
  4) 1-5% by weight of long glass fiber with a length of 0.4 mm-0.8 mm,
  5) 0.5 to 2% by weight of an ethylene-octene copolymer,
  6) 2-5% by weight of wollastonite powder,
  7) 60-85% by weight of calcium carbonate powers, and
  8) 1-6% by weight of an intumescent flame retardant; wherein
  the amounts of the first polypropylene, the second polypropylene, and the polyethylene are selected, so that the value of Rm as defined above of the second substrate layer satisfies 0.2<Rm<1.

In a preferred embodiment of the composite floor of the present invention, the bottom connective layer has a raw material formulation comprising: based on the weight of the total formulation,
  85-98% by weight of a polypropylene having a molecular weight of 100,000 to 300,000,
  1-12% by weight of a polypropylene-maleic anhydride grafted copolymer having a molecular weight of 20,000 to 50,000, wherein the grafting rate of the maleic anhydride is 1-10%,
  0.1-0.5% by weight of an antioxidant,
  0.2-0.5% by weight of an ultraviolet light absorber, and
  0.2-0.5% by weight of a light stabilizer.

In a preferred embodiment of the composite floor of the present invention, the bottom surface of the bottom connective layer is subjected to a surface-polarizing treatment.

In a preferred embodiment of the composite floor of the present invention, the bottom surface of the bottom connective layer is subjected to a surface-polarizing treatment by using the following treatment agent A and treatment agent B:

Treatment agent A comprises:
  10-40% by weight of turpentine,
  10-40% by weight of ethyl acetate,
  10-20% by weight of a surfactant, and
  2-10% by weight of an emulsifier.
Treatment agent B comprises:
  0.5-1% by weight of $KMnO_4$, and
  99-99.5% by weight of deionized water.

The present invention also provides a process for preparing the above-mentioned lightweight environment-friendly polypropylene composite floor, comprising the following steps:
  1) preparing a first substrate layer: mixing raw materials for forming a first substrate layer together, subjecting the mixture to internal milling, open milling, calendering and cooling steps to prepare a first substrate layer;
  2) preparing a second substrate layer: mixing raw materials for forming a second substrate layer together, subjecting the mixture to internal milling, open milling, calendering and cooling steps to prepare a second substrate layer;

3) Preparing a super-transparent wear-resistant layer: adding raw materials for forming a super-transparent wear-resistant layer into a planetary twin-screw extruder, kneading and extruding the raw materials, feeding the extruded mixture into a calenderer and rapidly cooling the calendered sheet to obtain a super-transparent wear-resistant layer, which has a haze of 8-11% and a light transmittance of 90-95%;
4) Preparing a decorative layer: applying a decorative layer to the upper surface of the first substrate layer or to the bottom surface of the super-transparent wear-resistant layer through a thermal transfer method, or by using an ink-printed environment-friendly composite paper;
5) Preparing a bottom connective layer: extruding raw materials for forming a bottom connective layer into a sheet, subjecting the extruded sheet to an embossing process to form a rough surface having embossed pattern thereon;
6) forming a laminated floor body comprising the super-transparent wear-resistant layer, the decorative layer, the first substrate layer, the second substrate layer, and the bottom connective layer obtained above in this order by a hot press lamination process, and optionally, the embossing process of the bottom connective layer is carried out simultaneously with the hot press lamination process;
7) preparing a scratch-resistant coating layer: applying a polyurethane-based coating onto the upper surface of the super-transparent wear-resistant layer of the laminated floor body obtained by the above described hot press lamination process to form a scratch-resistant coating layer; and optionally,
8) preparing a back adhesive layer: applying a hot melt adhesive to the bottom surface of the bottom connective layer by an adhesive applier.

In a preferred embodiment of the preparation process of the present invention, the upper surface of the super-transparent wear-resistant layer is subjected to a surface polarizing treatment before applying the scratch-resistant coating layer onto it.

In a preferred embodiment of the preparation process of the present invention, the upper surface of the super-transparent wear-resistant layer is subjected to a surface-polarizing treatment by using the following treatment agent A and treatment agent B:

Treatment agent A comprises:
  20-40% by weight of turpentine.
  20-40% by weight of ethyl acetate,
  20-30% by weight of a surfactant, and
  2-10% by weight of an emulsifier.
Treatment agent B comprises:
  0.5-1% by weight of KMnO$_4$, and
  99-99.5% by weight of deionized water.

In a preferred embodiment of the preparation process of the present invention, the bottom surface having embossed pattern thereon of the bottom connective layer is subjected to a surface-polarizing process.

In a preferred embodiment of the preparation process of the present invention, the bottom surface having embossed pattern thereon of the bottom connective layer is subjected to a surface-polarizing process by using the following treatment agent A and treatment agent B:

Treatment agent A comprises:
  10-40% by weight of turpentine.
  10-40% by weight of ethyl acetate,
  10-20% by weight of a surfactant, and
  2-10% by weight of an emulsifier.

Treatment agent B comprises:
  0.5-1% by weight of KMnO$_4$, and
  99-99.5% by weight of deionized water.

In a preferred preparation process of the present invention, the decorative layer is formed onto the upper surface of the first substrate layer or the bottom surface of the super-transparent wear-resistant layer by a thermal transfer process with following process parameters:

| | |
|---|---|
| Hardness of the substrate surface | 60°-90° |
| Preheated surface hot air knife | 50-60° C. |
| Traction speed | 2-4 m/min |
| Transfer temperature | 300-370° C. |
| Transfer pressure | 0.4-0.5 Mpa |
| Transfer thickness | 12-26 μm. |

In a preferred embodiment of the preparation process of the present invention, each of the first substrate layer and the second substrate layer is prepared by the following steps: mixing raw materials for the substrate layer in a mixer with a stirring speed of 5000-8000 rpm, internal milling the mixture in an internal mill at a temperature of 100-190° C. further open milling the mixture in a roller mill at a temperature of 120-190° C., transferring the thoroughly mixed and milled raw materials into a calenderer and calendering them at a temperature of 150-180° C., and then cooling the calendered sheet to obtain a substrate layer.

In a preferred embodiment of the preparation process of the present invention, the super-transparent wear-resistant layer is prepared by the following steps: mixing and extruding raw materials of the super-transparent wear-resistant layer in a planetary twin-screw extruder at a plasticizing temperature of 170-220° C.; calendering the extruded materials in a calenderer at a temperature of 150-185° C., and finally cooling the calendered sheet with cooling wheels at a temperature of 50-60° C. and a line speed of 40-100 m/min.

The composite floor of the present invention has the following advantages: the super-transparent wear-resistant layer is prepared by a rapidly cooling process and thus has an excellent transparency; the specific formulations of the first substrate layer and the second substrate layer endow the composite floor with excellent dimensional stability, mechanical properties, processing properties, and flame retardance; the surface-polarizing treatment to the super-transparent wear-resistant layer before applying the scratch-resistant layer improves the compactness between the scratch-resistant layer and the super-transparent wear-resistant layer, and endows the composite floor with good scratch resistance; the surface-polarizing treatment to the bottom connective layer improves the compactness between the composite floor and the adhesive applied on the ground; the thermal transfer process of the decorative layer or using an ink-printed environment-friendly composite paper as the decorative layer ensure good compactness between the decorative layer and the super-transparent wear-resistant layer, and between the decorative layer and the first substrate layer without using an additional connective layer; the simple internal milling and open milling processes for preparing the substrate layers and the direct hot press lamination process of the laminated floor body improve the productivity and product efficiency, save process energy, and reduce the cost of the product.

DESCRIPTION OF DRAWING

FIG. 1 schematically shows a layer-structure of an embodiment of the composite floor of the present invention.

EMBODIMENTS OF THE INVENTION

Unless otherwise defined, all technical and scientific terms used herein have the same meanings commonly understood by an ordinary skilled person in the art. In case of conflict, the definitions provided in present specification prevail.

Unless otherwise indicated, all percentages, parts, and proportions are given by weight.

When a numerical value or range, preferred range, or preferred values of lower limit and upper limit are given, it should be understood that any ranges formed by any smaller value and any larger value provided or in the provided range are specifically disclosed, regardless of whether the ranges are separately disclosed. Unless otherwise stated, any range of numerical values described herein intends to include the end values of the range, and all integers and fractions within the range.

The word "a" is used to describe the elements and components of the invention. It's just a matter of convenience and in order to describe the present invention in general. Unless otherwise clearly expressed, it should be understood as including "one" or "at least one".

The term "polypropylene", abbreviated as PP, generally refers to a polypropylene homopolymer, but also includes polypropylene copolymers usually referred to as "PP" in industrial practice, e.g., ethylene and propylene copolymer, butylene and propylene copolymer, and copolymers of propylene and other α-olefins, or polypropylene blends.

The expression "polypropylene floor" is used to denote a composite floor with substrate layer comprising one or more polypropylene homopolymers and/or one or more polypropylene copolymers and/or one or more polypropylene blends. The polypropylene homopolymer usually has a molecular weight in a range of 200,000 to 600,000. The polypropylene copolymer may be a random copolymer, a block copolymer or a grafted copolymer, wherein the comonomer other than propylene may be selected from the group consisting of ethylene, butene, maleic anhydride, and the like. The polypropylene blend comprises, besides polypropylene, one or more other polymers selected from polyethylene, polystyrene, poly(meth)acrylates, polyurethanes, ethylene-propylene rubber, and the like.

The expression "polypropylene-based" refers to a material or formulation comprising, as an important component or a main component, one or more polypropylene homopolymers and/or one or more polypropylene copolymers and/or one or more blends of polypropylene with one or more other polymers.

The expression "polyurethane-based" refers to a material or formulation comprising, as an important component or a main component, one or more polyurethane homopolymers and/or one or more polyurethane copolymers and/or one or more blends of polyurethane with one or more other polymers The expression "upper surface" refers to the surface of a component layer of the composite floor, which is farther away from the ground, and the expression "bottom surface" refers to the surface of a component layer of the composite floor, which is towards the ground.

The expression "melt index", abbreviated as "MI", also known as "melt flow rate" (MFR), refers to a molten thermoplastic resin, in grams, flowing in ten minutes through a small opening with a diameter of 0.2 cm of a rheometer under a load of 2.16 Kg at 190° C., and the unit is g/10 min.

The expression "surface-polarizing treatment" refers to a surface treatment for processing a non-polar polypropylene-based surface with a surface treatment agent to increase properties such as polarity and surface tension of the surface.

The present invention provides a composite floor comprising, from top to bottom:
1) a scratch-resistant coating layer, which is formed from a polyurethane-based coating;
2) a super-transparent wear-resistant layer, which is formed from raw materials comprising polypropylene and a nucleating agent, and has a haze of less than 11% and a light transmittance of greater than 90%;
3) a decorative layer, which is a layer of ink-printed environment-friendly composite paper or a layer formed through a thermal transfer process;
4) a first substrate layer comprising a polypropylene blend consisting of a first polypropylene having a melt index of 0.1-0.9 g/10 min and a second polypropylene having a melt index of 5-30 g/10 min, a polyethylene having a melt index of 2-20 g/10 min. glass fiber with a length of 0.4-0.8 mm, an ethylene-octene copolymer, wollastonite powder, calcium carbonate powder and a flame retardant, wherein, based on the total weight of the first substrate layer, the weight percentage of the polypropylene blend is represented by "wt % pp", the weight percentage of the polyethylene is represented by "wt % pe", the average melt index of the polypropylene blend is represented by "MIpp", the melt index of the polyethylene is represented by "MIpe", and $$Rm = (MIpp \times wt\% pp)/(MIpe \times wt\% pe),$$

then Rm satisfies 1<Rm<10;
5) a second substrate layer comprising a polypropylene blend consisting of a first polypropylene having a melt index of 0.1-0.9 g/10 min and a second polypropylene having a melt index of 5-30 g/10 min, a polyethylene having a melt index of 2-20 g/10 min, glass fiber with a length of 0.4-0.8 mm, an ethylene-octene copolymer, wollastonite powder, calcium carbonate powder and a flame retardant, wherein, based on the total weight of the second substrate layer, the weight percentage of the polypropylene blend is represented by "wt % pp", the weight percentage of the polyethylene is represented by "wt % pe", the average melt index of the polypropylene blend is represented by "MIpp", the melt index of the polyethylene is represented by "MIpe", and $$Rm = (MIpp \times wt\% pp)/(MIpe \times wt\% pe),$$

then Rm satisfies 0.2<Rm<1;
6) a bottom connective layer formed from a polypropylene-based material and having a rough surface formed by embossing; and optionally
7) a back adhesive layer, which is a hot melt adhesive layer applied on the bottom surface of the bottom connective layer.

The present invention also provides a process for preparing the above-mentioned lightweight environment-friendly polypropylene composite floor, comprising the following steps:
1) preparing a first substrate layer: mixing raw materials for forming a first substrate layer together, subjecting the mixture to internal milling, open milling, calendering and cooling steps to prepare a first substrate layer;

2) preparing a second substrate layer: mixing raw materials for forming a second substrate layer together, subjecting the mixture to internal milling, open milling, calendering and cooling steps to prepare a second substrate layer;
3) Preparing a super-transparent wear-resistant layer: adding raw materials for forming a super-transparent wear-resistant layer into a planetary twin-screw extruder, kneading and extruding the raw materials, feeding the extruded mixture into a calenderer and rapidly cooling the calendered sheet to obtain a super-transparent wear-resistant layer, which has a haze of 8-11% and a light transmittance of 90-95%;
4) Preparing a decorative layer: applying a decorative layer to the upper surface of the first substrate layer or to the bottom surface of the super-transparent wear-resistant layer through a thermal transfer method, or by using an ink-printed environment-friendly composite paper;
5) Preparing a bottom connective layer: extruding raw materials for forming a bottom connective layer into a sheet, subjecting the extruded sheet to an embossing process to form a rough surface having embossed pattern thereon;
6) forming a laminated floor body comprising the super-transparent wear-resistant layer, the decorative layer, the first substrate layer, the second substrate layer, and the bottom connective layer obtained above in this order by a hot press lamination process, and optionally, the embossing process of the bottom connective layer is carried out simultaneously with the hot press lamination process;
7) preparing a scratch-resistant coating layer: applying a polyurethane-based coating onto the upper surface of the super-transparent wear-resistant layer of the laminated floor body obtained by the above described hot press lamination process to form a scratch-resistant coating layer; and optionally,
8) preparing a back adhesive layer: applying a hot melt adhesive to the bottom surface of the bottom connective layer by an adhesive applier.

Further non-limiting explanations about the formulation and preparation process for each layer of the composite floor of the present invention is provided below, respectively.

Substrate Layer

The expression "substrate layer" here refers to the first substrate layer and the second substrate layer, respectively. The first substrate layer and the second substrate layer of the composite floor of the present invention each adopts a blend of two polypropylenes having different melt indexes and a polyethylene as the basic polymer materials.

Among all the synthetic resins, polypropylene has the lowest density, which is in a range of 0.9-0.91 g/cm$^3$, and is about 60% of the density of PVC. Accordingly a composite floor using polypropylene as a substrate layer is much lighter than a composite floor using PVC as a substrate layer. Moreover, polypropylene does not release toxic gases. Therefore, polypropylene is an ideal material for preparing a lightweight and environment-friendly composite floor.

The raw materials for the substrate layer of the composite floor of the present invention comprise a polypropylene blend, which comprises a first polypropylene having a melt index (MI) of 0.1-0.9 g/10 min, preferably 0.2-0.6 g/10 min. and a second polypropylene having a melt index (MI) of 5-30 g/10 min, preferably 6-15 g/10 min. By using two different polypropylenes having different melt indexes, both the mechanical properties and processing properties of the composite floor are ensured. In each of the first substrate layer and the second substrate layer, based on the total weight of the substrate layer, the amount of the first polypropylene is preferably 0.5 to 10% by weight, more preferably 1.5 to 6% by weight; and the amount of the second polypropylene is preferably 0.5 to 10% by weight, more preferably 1.5 to 6% by weight.

The raw materials for the substrate layer of the composite floor of the present invention further comprise a polyethylene having a melt index (MI) of 2-20 g/10 min. The polyethylene and the polypropylene blend form a blended melt during processing. The blended melt of the polypropylenes and polyethylene can be considered as a suspension system consisting of the two types of polymers, wherein the polypropylenes are the continuous phase, and the polyethylene is the dispersed phase. Based on the total weight of the substrate layer, the amount of the polyethylene is preferably 1 to 10% by weight, more preferably 2-9% by weight.

The inventors have surprisingly found that in the substrate layers of the composite floor, there is a certain regularity among the average melt index of the polypropylene blend, the melt index of the polyethylene, the relative amount of the polypropylene blend and the relative amount of the polyethylene in the substrate layer: when the percentage of the polypropylene blend in the substrate layer is represented by Wt % pp, the average melt index of the polypropylene blend is represented by MIpp, the percentage of the polyethylene in the substrate layer is represented by Wt % pe, and the melt index of the polyethylene is represented by MIpe.

$$Rm=(MIpp \times Wt\ \%)/(MIpe \times Wt\ \%\ pe),$$

then when Rm is within an appropriate range, the polyethylene endows the polypropylene blend with optimal strengthening and toughening enhancement Here, the average melt index of the polypropylene blend MIpp denotes the weighted average melt index of the two different polypropylenes having different melt indexes, i.e., when the first polypropylene is represented by PP1, its melt index is represented by MIpp1, and the percentage of PP1 in the polypropylene blend is represented by x %, while the second polypropylene is represented by PP2, its melt index is represented by MIpp2, and the percentage of PP2 in the polypropylene blend is represented by (1−x %), then the average melt index of the polypropylene blend $$MIpp=MIpp1 \times x\% + MIpp2 \times (1-x\%).$$

Table 1 below shows the influence of different Rm ranges on the mechanical properties of the resulting substrate layers.

TABLE 1

| Rm (MIpp × Wt %$_{PP}$)/ (MIpe × Wt % pe) | Roughness (elongation rate), % ISO-527-2 | Tensile yield strength Mpa ISO-178 |
| --- | --- | --- |
| Rm < 0.5 | 450-520 | <22 |
| 0.2 < Rm < 1 | 300-500 | 25-30 |
| Rm = 1 | 250-300 | 28-32 |
| 10 > Rm > 1 | 150-250 | 30-35 |
| Rm > 10 | <100 | 34-37 |

In the composite floor of the present invention, the relative amounts of the polypropylenes and the polyethylene in the first substrate layer and the second substrate layer are adjusted so that the Rm value of the first substrate layer satisfies 1<Rm<10, and the Rm value of the second substrate layer satisfies 0.2<Rm<1. With the above design, an excellent balance between mechanical properties and physical properties, such as shrinkage-resistance and warpage-resistance, of the composite floor is achieved.

The raw materials for the substrate layer of the composite floor of the present invention further comprise long glass fibers having a length of 0.4 mm-0.8 mm. Generally, polypropylene material has a tensile strength between 20-30 Mpa, a bending strength between 25-50 Mpa, and a bending modulus between 800-1500 Mpa. By adding long glass fibers having a length of 0.4 mm-0.8 mm into the substrate layer, the mechanical properties, heat-resistance and dimensional stability of the composite floor of the present invention are improved even by several times. The long glass fibers in the substrate layer are preferably in an amount of 1 to 10% by weight, more preferably 1 to 5% by weight.

Table 2 below shows a comparison between mechanical properties of a polypropylene resin added with long glass fibers and a control polypropylene resin without adding long glass fibers.

TABLE 2

|  | Test Standard | Control polypropylene | Polypropylene containing 5 phr 0.6 mm glass fibers | Polypropylene containing 10 phr 0.6 mm glass fibers | Polypropylene containing 20 phr 0.6 mm glass fibers |
|---|---|---|---|---|---|
| Tensile strength (Mpa) | ISO-527-2 | 25 | 35 | 70 | 90 |
| Bending strength (Mpa) | ISO-178 | 30 | 40 | 90 | 120 |
| Bending modulus (Mpa) | ISO-178 | 850 | 1200 | 3000 | 4500 |
| Dimensional stability | EN 434 | 2.5% | 1.0% | 0.60% | 0.35% |
| Heat resistance (° C.) | GB-1710-79 | 100 | 110 | 135 | 150 |

The raw materials for the substrate layer of the composite floor of the present invention further comprise an ethylene-octene copolymer (POE) and wollastonite powder. Ethylene-octene copolymer (POE) is an ideal impact-resistance modifier for polypropylene. However, with the increase of the added amount of POE, tensile strength and bending strength decrease. The present invention adopts a blend of POE and wollastonite powder having an aspect ratio of preferably 5.0 to 10.0, more preferably 5.0-7.0, with the ratio of wollastonite to POE in a range of 1:1 to 10:1, preferably 1:2 to 1:4, particularly preferably 1:3. By controlling the aspect ratio of the wollastonite powder, the contact area between the wollastonite particles and the polypropylene substrate materials is increased, which absorbs more impact energy and thus further modifies the toughness and strength of the polypropylene materials. The ethylene-octene copolymer is present in the substrate layer in an amount of preferably 0.5-2% by weight, more preferably 0.8-1.5% by weight. The wollastonite powder is present in the substrate layer in an amount of preferably 2-8% by weight, more preferably 3-5% by weight.

The raw materials for the substrate layer of the composite floor of the present invention further comprise calcium carbonate powder. The addition of calcium carbonate powder having a particle size of 500-2000 mesh, more preferably 1000-1500 mesh, and a whiteness of 90 or more, more preferably 95 or more, can increase the dimensional stability of the composite floor, and reduce the production cost. The amount of the calcium carbonate powder in the substrate layer is preferably 60-85% by weight, more preferably 75-85% by weight.

The raw materials for the substrate layer of the composite floor of the present invention further comprise a flame retardant. Preferred flame retardant can be selected from intumescent flame retardants (IFR). IFR is a type of flame retardants containing C, N, and P as core components and mainly consists of three parts: (1) a carbon source (carbon-forming agent), which is a kind of carbon-rich multi-functional substances, such as starch, pentaerythritol and diacetal thereof; (2) an acid source (dehydrating agent), which may be an inorganic acid or a salt that can generate acid in situ upon heating, such as phosphoric acid or ammonium polyphosphate, etc.; and (3) a gas source (environmental blowing agent). The flame retardant mechanism of IFR is that, when heated, the carbon-forming agent undergoes a dehydration reaction under the action of the acid source, and forms a fluffy carbon layer having closed-cell structure under the action of the gas produced by the decomposition of the blowing agent. The carbon layer can reduce energy transfer between the heat source and the burning polymers, and prevent gas diffusion, such that the combustion of the polymers can be terminated due to insufficient supply of fuel and oxygen.

All of the generally known intumescent flame retardants can be used in the composite floor of the present invention, preferably the US Great Lake's products CN329. The flame retardant property of the composite floor of the present invention satisfies the level of Bf1-S1. The content of the flame retardant in the substrate layer is preferably 1-8% by weight, more preferably 1-6% by weight.

In a preferred embodiment of the composite floor of the present invention, the formulation of raw materials for the substrate layer comprises:

1) 0.5-10% by weight of a first polypropylene having a melt index of 0.1-0.9 g/10 min,
2) 0.5-10% by weight of a second polypropylene having a melt index of 5-30 g/10 min.
3) 1-10% by weight of a polyethylene having a melt index of 2-20 g/10 min,
4) 1-5% by weight of glass fiber with a length of 0.4-0.8 mm,
5) 0.5-2% by weight of an ethylene-octene copolymer,
6) 2-5% by weight of wollastonite powder.
7) 60-85% by weight of calcium carbonate powder, and
8) 1-6% by weight of a flame retardant, wherein the above weight percentages are based on the weight of the total formulation. For the first substrate layer, on the basis of the above-described formulation, the amounts of the two polypropylenes in the polypropylene blend and the amount of the polyethylene are adjusted such that the Rm value as defined above of the first substrate layer satisfies 1<Rm<10; for the second substrate layer, on the basis of the above formulation, the amounts of the two polypropylenes in the polypropylene blend and the amount of the polyethylene are adjusted such that the Rm value as defined above of the second substrate layer satisfies 0.2<Rm<1.

It is preferred that each of the first substrate layer and the second substrate layer of the composite floor of the present invention is prepared by a process comprising steps of mixing, internal milling, open milling, calendering and cooling.

In a preferred embodiment of the present invention, the raw materials for the substrate layer is mixed in a mixer with a stir speed preferably of 4000-10000 rpm, more preferably of 5000-8000 rpm, and then the mixture is internal milled in an internal mill at a temperature preferably of 100-190° C., followed by an open milling in a roller mill at a temperature preferably of 120-190° C.; the internal milling and open milling can be carried out repeatedly and then the thoroughly mixed and milled materials are calendered, for example, using a reverse L-shape four-roll calenderer, to prepare a sheet of substrate layer at a temperature, for example, of 150-180° C., and finally the calendered sheet is cooled with a set of cooling wheels, preferably by a multi-stage cooling process.

Table 3 below shows the process conditions for preparing a substrate layer in a preferred embodiment of the present invention:

0.2 to 0.8% by weight, preferably 0.3 to 0.6% by weight of an ultraviolet absorber, and 0.2 to 0.5% by weight of a light stabilizer. The nucleating agent may be any nucleating agent generally used in polypropylene plastics, such as di(p-methylbenzylidene) sorbitol. The antioxidant may be any antioxidant generally used in polypropylene plastics, such as 3-tert-butyl-4-hydroxy anisole.

The ultraviolet light absorber can be any UV absorber commonly used for polypropylene plastics, for example 2-(2-hydroxy-5-methylphenyl) benzotriazole (CAS NO. 2440-22-4). The light stabilizer may be any light stabilizer generally used in polypropylene plastics, such as a polymer obtained from succinic acid and 4-hydroxy-2,2,6,6-tetramethyl-1-piperidinol (CAS NO. 70198-29-7).

The formulation for the super-transparent wear-resistant layer of the present invention comprises a nucleating agent, which accelerates crystallization, and renders the crystal particles finer, so that the crystal diameter is smaller than the wavelength of visible light and thus cannot scatter visible light, which effectively increases transparency.

In a preferred embodiment of the present invention, the super-transparent wear-resistant layer is prepared through the following steps: adding raw materials of polypropylene, polypropylene-maleic anhydride grafted copolymer, and nucleating agent for forming the super-transparent wear-resistant layer into a planetary twin-screw extruder, kneading and extruding the raw materials, feeding the extruded mixture into a calenderer and rapidly cooling the calendered

TABLE 3

| Mixer Stir speed | Internal mill Temp. ° C. Time | Open mill A Temp. ° C. | Open mill B Temp. ° C. | Calenderer | | | Cooling wheels | |
|---|---|---|---|---|---|---|---|---|
| | | | | Temp. of upper roll ° C. | Temp. of middle roll ° C. | Temp. of lower roll ° C. | Temp. of the first stage ° C. | Temp. of the second stage ° C. |
| 5000-8000 RPM | 100-190 5-15 min | 120-190 | 120-190 | 170-180 | 160-170 | 150-160 | 60-80 | 40-60 |

Polypropylene is a crystalline polymer having a softening point very close to its melting point, resulting in a narrow window of processing temperature. Due to the low melt strength and insufficient strain hardening effect, it is often unable to prepare a substrate layer from polypropylene efficiently and rapidly through internal milling and open milling. By using the formulation for the substrate layer of the present invention, a polypropylene based substrate layer can be prepared through conventional internal milling and open milling processes with a production line speed of up to 30-40 m/min, which dramatically improves the productivity and production efficiency, and can save energy and reduce costs.

Super-Transparent Wear-Resistant Layer

In a preferred embodiment of the composite floor of the present invention, the raw material formulation for the super-transparent wear-resistant layer comprises: based on the weight of the total formulation, 85-98% by weight, preferably 95-98% by weight of a polypropylene having a molecular weight of 100,000 to 300,000, preferably 150,000 250,000; 1-12% by weight, preferably 1-3% by weight of a polypropylene-maleic anhydride grafted copolymer having a molecular weight of 20,000-50,000, preferably 25,000-40,000, wherein the grafting rate of the maleic anhydride is 1-10%, preferably 1-3%; 0.2 to 0.8% by weight, preferably 0.3 to 0.6% by weight of a nucleating agent; 0.1-0.5% by weight, preferably 0.2 to 0.4% by weight of an antioxidant;

sheet with a set of cooling wheels to obtain a super-transparent wear-resistant layer, which has a haze of less than 11%, preferably 8-11%, and a light transmittance of greater than 90%, preferably 90-95%.

Preferably, the plasticizing temperature of the planetary twin-screw extruder is 170-220° C., the temperature of the calenderer is 150-185° C., the cooling temperature of the cooling wheels is 50-60° C., and the line speed at the cooling wheels is 40-100 m/min.

In the preparation process of the composite floor of the present invention, the raw materials for forming the super-transparent wear-resistant layer are sufficiently mixed and kneaded by using a planetary twin-screw extruder, the obtained blended melt is fed into a calenderer to form a calendered sheet and then the calendered sheet is rapidly cooled through a set of cooling wheels so that the melt rapidly passes through its crystallization zone, reducing the degree of crystallinity, and the crystalline polymorph can be controlled in the form of quasi hexagonal body. Since quasi hexagonal crystal form has best transparency among the possible five types of crystalline polymorphs of polypropylene, a super-transparent effect is achieved.

Table 4 below shows a comparison of transparency between a super-transparent wear-resistant layer of the present invention and a conventional polypropylene wear-resistant layer.

TABLE 4

|  | Haze(%) | Light transmittance (%) |
|---|---|---|
| Conventional PP wear-resistant layer Thickness 0.5 mm | 56 | 40 |
| super-transparent wear-resistant layer of the present invention Thickness 0.5 mm | 8 | 90 |

Decorative Layer

In the composite floor of the present invention, there is no particular limitation on the ink formulation used for the decorative layer, and any ink formulation commonly used for decorative layer of floor can be used, for example the following ink formulations:

Black ink Formulation: 30 parts of A-2175 resin solution (37%): 8 parts of carbon black, 1.5 parts of Westlands, and 0.5 part of Qinglian; 5 parts of emulsified oil; 10 parts of J624; 15 parts of J631; 1 part of aqueous wax; 8 parts of ethylene glycol monobutyl ether, 0.5 part of antifoaming agent; and 24 parts of deionized water.

Red Ink formulation: 30 parts of A-2175 resin solution (37%); 6 parts of Big Pink, and 2 parts of Li Saul Red; 5 parts of emulsified oil; 10 parts of J624; 15 parts of J631; 1 part of aqueous wax; 8 parts of ethylene glycol monobutyl ether; 0.5 part of antifoaming agent; and 24 parts of deionized water.

Dark green ink formulation: 30 parts of A-2175 resin solution (37%); 5 parts of phthalocyanine green and 3 parts of Hydrazine yellow; 5 parts of emulsified oil; 10 parts of J624; 15 parts of J631; 1 part of aqueous wax; 8 parts of ethylene glycol monobutyl ether; 0.5 part of antifoaming agent; and 22.5 parts of deionized water.

Sky blue ink formulation: 30 parts of A-2175 resin solution (37%); 6.5 parts of phthalocyanine blue BGS and 1.5 parts of titanium dioxide; 5 parts of emulsified oil; 10 parts of J624; 15 parts of J631; 1 part of aqueous wax; 8 parts of ethylene glycol monobutyl ether; 0.5 part of antifoaming agent; and 22.5 parts of deionized water.

In a preferred embodiment of the present invention, the decorative layer is prepared by printing an environment-friendly nano composite paper with an ink formulation. The raw materials for the environment-friendly nano composite paper comprise: 10-30% by weight of silicon-based nano powder, such as SiC, $Si_3N_4$ or Si/C/N powder, with a particle size of 10 to 100 nanometers; 1-5% by weight of a dispersing agent, such as $PMMA-NH_4$ (1M $NH_4PF_6$ liquid electrolyte+PMMA); 20-25% by weight of a polyethylene having a molecular weight of 100,000-300,000, preferably about 200,000; 10 to 20% by weight of a polypropylene having a molecular weight of 200,000-400,000, preferably about 300,000; 40-50% by weight of one or more inorganic mineral powder fillers selected from the group consisting of, for example, calcium carbonate, calcium sulfate, kaolin, mica, zinc oxide, dolomite powder, silica powder, talc, diatomaceous earth, and mixtures thereof; 1-3% by weight of a lubricant, and 1-2% by weight of an antistatic agent.

When silicon-based nano powder is introduced into a substrate material, there are two different status of the powder particles: one status is that the particles form aggregates, where primary particles grow into secondary particles, which adhere to each other forming aggregates; the other status is that the powder particles repel each other and can move freely during the processing of the substrate material and form a stable dispersed phase.

In above preferred formulation of the composite paper for the decorative layer, a dispersant, such as $PMMA-NH_4$ ($NH_4PF_6$ liquid electrolyte+PMMA), is used to disperse the silicon-based nano powder. Since $PMMA-NH_4$ is a strong polyelectrolyte, the surface charges of the silicon-based nano powder are increased, so that electrostatic repulsion is occurred among the nanoparticles, and the repulsion energy ($V_T$) is increased to 30-40 mv, and accordingly an effectively stable dispersion of the silicon-based nano powder is achieved.

By adding the silicon-based nano powder, which has good dispersion stability, the strength and toughness of the composite paper are increased, and with the decrease of the crystal size of the material, the breaking strength increases faster than the yield strength, which increases the plasticity of the composite paper, and solves the problem that compactness between a conventional decorative layer and a non-polar polypropylene substrate layer is poor.

In another preferred embodiment of the present invention, the decorative layer is prepared by way of thermal transfer.

Known methods for preparing a decorative layer for a plastic floor comprise electroplating, spray painting, surface coating, printing and laminating, etc. However, these methods cannot be applied well on a polypropylene-based floor, because polypropylene is a non-polar material, and the affinity between the ink of the decorative layer and the surface of the polypropylene-based substrate layer is poor, resulting in poor compactness of the floor.

The present invention adopts a thermal transfer process, which endows the decorative layer with good compactness and heat-resistance. After the thermal transfer, the ink layer and the substrate layer are molten together, resulting in good compactness, and the process is simple and does not cause pollution.

Preferred conditions for the thermal transfer process of the present invention are given in Table 5 below:

TABLE 5

| Process parameters | Conditions | Remarks |
|---|---|---|
| Surface hardness of the substrate layer | 60°-90° | |
| Temperature for pre-heating the surface hot air knife | 50-60° C. (5 min) | To remove surface moisture |
| Traction speed | 2-4 m/min | |
| Transfer temperature | 300-370° C. | |
| Transfer pressure | 0.4-0.5 Mpa | To increase adhesion, wear-resistance and chemical-resistance |
| Transfer thickness | 12-26 μm | |

The decorative layer prepared by the thermal transfer process of the present invention has excellent performance. Various performance test results of the decorative layer are given below:

Hardness: using a 2H Zhonghua pencil with the pencil lead exposed more than 5 mm, marking the tested surface three times at a tilt angle of 45 degrees and under a load of 500 g, and wiping off the marked lines with an eraser. The tested surface was not scratched or damaged.

Wear-resistance: rubbing the tested surface with a cotton cloth under a load of 150 g back and force 100 times. The tested surface was not wore or peeled off.

Adhesion: adopting a One hundred Lattices Test: scratching out 25 square lattices of 1 mm×1 mm on the tested surface, sticking the lattices with 3M adhesive tape for 5 minutes, and then tearing off the adhesive tape. The tested surface in the lattices was not peeled off.

Chemical resistance: rubbing the tested surface with a cotton ball moistened with alcohol under a load of 1000 g for 300 times. There was no peeling off or discoloration.

Water resistance: putting the tested sample into tap water of 40±2° C., and soaking for 24 hours. There was no damage or delamination in the tested sample.

Moisture resistance: putting the tested sample in air at 40±2° C. with a humidity of 95% for 168 hours. There was no damage or peeling off.

Heat resistance: putting the tested sample in an oven at 60±2° C. for 168 hours. There was no damage or delamination.

Weather resistance: exposing the tested sample to ultraviolet irradiation (300 W/2 h). $\Delta E \leq 2.5$.

Bottom Connective Layer

In the composite floor of the present invention, the bottom connective layer is a layer based on a polypropylene wear-resistant material and is subjected to an embossing process. The formulation of the polypropylene wear-resistant material for the bottom connective layer is similar to the formulation for the super-transparent wear-resistant layer as mentioned above, except that the nucleating agent used for the preparation of the ultra-transparent is not necessary to be used in the bottom connective layer since there is no special requirement for the transparency of the bottom connective layer.

For example, the bottom connection layer may be prepared from a formulation comprising a polypropylene, a polypropylene-maleic anhydride grafted copolymer, and conventional additives through an extrusion process. In a preferred embodiment of the present invention, the formulation for the bottom connective layer comprises: based on the weight of the total formulation, 85-98% by weight, preferably 95-98% by weight of a polypropylene having a molecular weight of 100,000 to 300,000, preferably 150,000 to 250,000; 1-12% by weight, preferably 1-3% by weight of a polypropylene-maleic anhydride grafted copolymer having a molecular weight of 20,000-50,000, preferably 25,000-40,000, wherein the grafting ratio of the maleic anhydride is of 1-10%, preferably 1-3%; 0.1-0.5% by weight of an antioxidant, 0.2-0.5% by weight of an ultraviolet light absorber, and 0.2-0.5% by weight of a light stabilizer.

The embossing process for the bottom connective layer can be any conventional hot embossing method, e.g., a hot press molding process using oil pressure. Through the embossing process, a rough surface with embossed pattern thereon is formed at the bottom surface of the bottom connective layer.

Laminated Floor Body Obtained by a Hot Press Lamination Process

The layers produced above are laminated together by a hot press lamination process to form a laminated floor body in an order of, from top to bottom, the super-transparent wear-resistant layer, the decorative layer, the first substrate layer, the second substrate layer, and the bottom connective layer. Optionally, the embossing process for the bottom connective layer is carried out simultaneously with the hot press lamination process. There is no particular limitation on the hot press lamination process, which can by any conventional hot press lamination process.

Scratch-Resistant Coating Layer

After a laminated floor body comprising the supper-transparent wear-resistant layer, the decorative layer, the first substrate layer, the second substrate layer, and the bottom connective layer in this order is obtained by the hot press lamination process, a scratch-resistant coating layer can be applied on the upper surface of the supper-transparent wear-resistant layer.

In the composite floor of the present invention, there is no particular limitation on the coatings for forming the scratch-resistant layer, and any known coatings used in the art for floors can be used, such as polyurethane-based coatings. In a preferred embodiment of the present invention, a coating for forming the scratch-resistant layer is a polyurethane-based coating comprising: 40-50% by weight of a polyurethane oligomer having a molecular weight of 4000-6000 or a low molecular weight polyurethane-acrylate copolymer, 25-35% by weight of an acrylic monomer, 5-10% by weight of a chlorinated polypropylene having a molecular weight of 150,000 to 20,000, 10-12% by weight of a matting agent, and 4-6% by weight of a photopolymerization initiator.

In the composite floor of the present invention, before applying a coating for forming the scratch-resistant layer on the upper surface of the supper-transparent wear-resistant layer, preferably the upper surface of the supper-transparent wear-resistant layer is subjected to a surface polarizing treatment. Because polypropylene is a highly crystalline polymer, its molecular arrangement is in good order, the agglomerates are compact, the intermolecular interaction is strong, the molecular does not contain any polar functional group (e.g. $-C=O$, $-OH$, $-COOH$, etc.), and its polarity is low, making it difficult to be coated.

In a preferred embodiment of the present invention, the upper surface of the supper-transparent wear-resistant layer is subjected to a surface polarizing treatment, in order to introduce polar groups such as $-CHO$ and $-CO-$ into the surface molecules of the polypropylene to improve the surface polarity, which can effectively reduce the contact angle between the polypropylene surface and the coating, and thus the coating can spread out well on the polypropylene surface, forming an efficient scratch-resistant layer.

In a preferred embodiment of the composite floor of the present invention, the upper surface of the ultra-transparent wear-resistant layer, which is facing the scratch-resistant coating layer, is subjected to a surface-polarizing treatment by using the following treatment agent A and treatment agent B:

Treatment agent A comprises:
  20-40% by weight of turpentine (40 ml/L),
  20-40% by weight of ethyl acetate,
  20-30% by weight of a surfactant, and
  2-10% by weight of an emulsifier.

Treatment agent B comprises:
  0.5-1% by weight of $KMnO_4$, and
  99-99.5% by weight of deionized water.

Preferably, after the treatment with treatment agent A and treatment agent B, the surface of the ultra-transparent wear-resistant layer is further subjected to a corona treatment.

Table 6 shows comparison data of a treated polypropylene surface and an untreated polypropylene surface:

TABLE 6

|  | Surface status | Contact angle($\Theta$) |
|---|---|---|
| Control (untreated) | — | 83°-85° |
| 50° C. Treatment agent A 3 min | Small pores with diameter of 0.1-0.18 μm, and depth of 0.1 μm | 49°-54° |
| 50° C. Treatment agent A, 3 min + Treatment agent B, 1 min | Small pores with diameter of 0.2-0.35 μm, and depth of 0.15 μm | 34°-44° |
| 50° C. Treatment agent A, 3 min + Treatment agent B, 1 min + Corona treatment | Small pores with diameter of 0.3-0.5 μm, and depth of 0.15 μm | 28°-35° |

Surface Treatment of the Bottom Connective Layer

In a preferred embodiment of the composite floor of the present invention, the polypropylene-based bottom surface of the bottom connective layer is subjected to a surface polarizing treatment. The surface polarizing treatment can be carried out right after the embossing step for the bottom connective layer, or can be carried out after the formation of the above-mentioned laminated floor body. The bottom surface of the bottom connective layer is preferably treated with the following treatment agent A and treatment agent B:

Treatment agent A comprises:

| Turpentine (40 ml/L) | 10-40% by weight |
|---|---|
| Ethyl acetate | 10-40% by weight |
| Surfactant | 10-20% by weight |
| Emulsifier | 2-10% by weight. |

Treatment agent B comprises:

| KMnO$_4$ | 0.5-1% by weight |
|---|---|
| deionized water | 99-99.5% by weight |

In a preferred embodiment of the present invention, the bottom surface of the bottom connective layer is subjected to an embossing process, as well as a surface polarizing treatment, which greatly improves the surface tension of the bottom surface of the composite floor and solves the problem of poor adhesion between a conventional non-polar floor material and an adhesive applied on the ground. Table 7 illustrates surface tension data of different bottom connective layers:

TABLE 7

|  | Surface tension (tested by a dyne pen) |
|---|---|
| Control (untreated bottom connective layer) | 31 (dyn/cm) |
| Bottom connective layer with embossed rough surface | 34 (dyn/cm) |
| Bottom connective layer with embossed rough surface and further treated with treatment agent A and treatment agent B | 40 (dyn/cm) |

Back Adhesive Layer

The composite floor of the present invention may comprise a back adhesive layer, which is formed by applying a hot melt adhesive on the bottom surface of the bottom connective layer. The hot melt adhesive can be any conventional hot melt adhesive usually used for composite floor. In a preferred embodiment of the present invention, a back adhesive layer is formed on the bottom surface of the bottom connective layer by applying Taiwan Fu Hong 903 High polar hot melt adhesive via a coating machine.

EXAMPLE

Preparation of a Lightweight Environment-Friendly Polypropylene Composite Floor

1) Preparation of a First Substrate Layer and a Second Substrate Layer

Formulation for the first substrate layer comprising (based on the weight of the total formulation):

| Polypropylene (EPD60R, Liaoning Huajin, MI is 0.35) | 4.5% |
|---|---|
| Polypropylene (EP1X35F, Liaoning Huajin, MI is 8) | 4.5% |
| Polyethylene (MDPE7149, Qilu Petrochemical, MI is 4) | 3% |
| Long glass fiber (GF): Length is 0.4 mm | 1% |
| Ethylene-octene copolymer (Engage 8150, DuPont) | 1.2% |
| Wollastonite powder (aspect ratio is 6.0) | 3.6% |
| Intumescent Flame Retardant (CN 329, US Great Lake Corporation) | 1% |
| Calcium carbonate (ML 1003) | 81.2%, | wherein, Rm of the first substrate layer was 3.13 calculated as below:

$$MIpp=0.35\times 50\%+8\times 50\%=4.175$$

$$MIpe=4$$

$$Rm=(MIpp\times wt\% \ pp)/(MIpe\times wt\% \ pe)=(4.175\times 9\%)/(4\times 3\%)=3.13.$$

Formulation for the second substrate layer comprising (based on the weight of the total formulation):

| Polypropylene (EPD60R, Liaoning Huajin, MI is 0.35) | 1.5% |
|---|---|
| Polypropylene (EP1X35F, Liaoning Huajin, MI is 8) | 1.5% |
| Polyethylene (MDPE7149, Qilu Petrochemical, MI is 4) | 9% |
| Long glass fiber (GF): Length is 0.4 mm | 1% |
| Ethylene-octene copolymer (Engage 8150, DuPont) | 1.2% |
| Wollastonite powder (aspect ratio is 6.0) | 3.6% |
| Intumescent Flame Retardant (CN 329, US Great Lake Corporation) | 1% |
| Calcium carbonate (ML 1003) | 81.2%, | wherein, Rm of the second substrate layer was 0.35 calculated as below:

$$MIpp=0.35\times 50\%+8\times 50\%=4.175$$

$$MIpe=4$$

$$Rm=(MIpp\times wt\% \ pp)/(MIpe\times wt\% \ pe)=(4.175\times 3\%)/(4\times 9\%)=0.35$$

The raw materials of the above formulations for the first substrate layer and the second substrate layer respectively were mixed, internal milled, open milled, calendered and cooled to obtain a first substrate layer and a second substrate layer. Specific process parameters of the steps are given in Table 8 below:

TABLE 8

| Mixer Stir speed | Internal mill Temp. Time | Open mill A Temp. ° C. | Open mill B Temp. ° C. | Calenderer | | | Cooling wheels | |
|---|---|---|---|---|---|---|---|---|
| | | | | Temp. of upper roll ° C. | Temp. of middle roll ° C. | Temp. of lower roll ° C. | Temp. of the first stage ° C. | Temp. of the second stage ° C. |
| 5000 RPM | 150° C. 7 mins | 170 | 170 | 170 | 160 | 150 | 60 | 40 |

2) Preparation of a Super-Transparent Wear-Resistant Layer

Formulation for the super-transparent wear-resistant layer comprising (based on the weight of the total formulation):

| | |
|---|---|
| Polypropylene (2401, Yanshan Petrochemical Corporation, molecular weight is about 250,000) | 96.7% |
| Polypropylene-maleic anhydride copolymer (KT-1, Qingdao Lvwei Chemical, molecular weight is about 50,000) | 2% |
| Nucleating agent (di(p-methylbenzylene) sorbitol, DMBS) | 0.4% |
| Antioxidant (BHA 3-tert-butyl-4-hydroxy anisole) | 0.2% |
| UV absorbers (2-(2-hydroxy-5-methylphenyl) benzotriazole) CAS NO. 2440-22-4 | 0.4% |
| Light Stabilizer (622, a polymer of succinic acid with 4-hydroxy-2,2,6,6-tetramethyl-1 piperidinol) CAS NO. 70198-29-7 | 0.3% |

The raw materials of the above formulation for the super-transparent wear-resistant layer were fed into a planetary extruder and were kneaded and extruded followed by rapid cooling to obtain a super-transparent wear-resistant layer. The specific process parameters are given in Table 9 below:

TABLE 9

| | Planetary extruder | | | Calenderer | | | Cooling wheels | |
|---|---|---|---|---|---|---|---|---|
| | First section | Second section | Third Section | Upper roll | Middle roll | Lower roll | First stage | Second stage |
| Temperature (° C.) | 170-190 | 190-220 | 175-190 | 170-185 | 165-175 | 150-170 | 70 | 50 |
| Screw speed | Main screw 900 RMP Feeding 500 RMP | | | | | NA | | |
| Line speed (m/min) | NA | | | 40 | 45 | 48 | 50 | 60 |

The obtained super-transparent wear-resistant layer has a haze of 8% and a light transmittance of 95%.

3) Preparation of a Decorative Layer

By a thermal transfer process, a decorative layer was applied to the upper surface of the first substrate layer. Process parameters of the thermal transfer process are given in Table 10 below:

TABLE 10

| Process parameters | Conditions | Remarks |
|---|---|---|
| Surface hardness of the substrate | 70° | |
| Preheated temperature of surface hot air knife | 50° C. (5 min) | to remove surface moisture |
| Traction speed | 2 m/min | |
| Transfer Temperature | 350° C. | |
| Transfer pressure | 0.4 Mpa | to enhance adhesion, wear resistance and chemical resistance |
| Transfer thickness | 12 μm | |

4) Preparation of a Bottom Connective Layer

Formulation for the bottom connective layer comprising (based on the weight of the total formulation):

| | |
|---|---|
| Polypropylene (2401, Yanshan Petrochemical Corporation, molecular weight is about 250,000) | 96.7% |
| Polypropylene-maleic anhydride copolymer (KT-1, Qingdao Lvwei Chemical, molecular weight is about 50,000) | 2% |
| Antioxidant (BHA 3-tert-butyl-4-hydroxy anisole) | 0.2% |
| UV absorber (2-(2-hydroxy-5-methylphenyl) benzotriazole) CAS NO. 2440-22-4 | 0.4% |
| Light Stabilizer (622, polymer of succinate with 4-hydroxy-2,2,6,6-tetramethyl-1-piperidinol) CAS NO. 70198-29-7 | 0.3% |

The raw materials of the above formulation for the bottom connective layer were mixed, extruded, calendered and cooled to obtain a bottom connective layer. Specific process parameters are given in Table 11 bellow:

TABLE 11

| | Planetary extruder | | | Calenderer | | | Cooling wheels | |
|---|---|---|---|---|---|---|---|---|
| | First section | Second section | Third Section | Upper roll | Middle roll | Lower roll | First stage | Second stage |
| Temperature (° C.) | 170-190 | 190-220 | 175-190 | 170-185 | 165-175 | 150-170 | 70 | 50 |
| Screw speed | Main screw 900 RMP Feeding 500 RMP | | | | | NA | | |
| Line speed (m/min) | NA | | | 40 | 45 | 48 | 40 | 50 |

The bottom surface of the obtained bottom connective layer was further subjected to an embossing process using an oil hot press molding method to form a rough surface having embossed pattern thereon.

5) Preparation of a Laminated Floor Body by a Hot Press Lamination Process

The layers produced above were laminated together by a hot press lamination process to form a laminated floor body in an order of, from top to bottom, the super-transparent wear-resistant layer, the decorative layer, the first substrate layer, the second substrate layer, and the bottom connective layer. Specifically, the hot press lamination process was performed by an oil hot press lamination machine, which is consisted of multiple laminating plates and a multi-column hydraulic press, wherein each laminating plate can be controllably heated, pressed and cooled with hot oil or vapor. Specific process parameters are given in Table 12 below:

TABLE 12

| Hot press lamination | 1. Temperature: 160° C.<br>2. Time of the three sections:<br>(a) water discharge and air inlet: 3 min<br>(b) heating: 22 min<br>(c) air discharge and water inlet: 35 min<br>3. Pressure of the three sections:<br>(a). 40 kg/30 min<br>(b). 60 kg/30 min<br>(c). 80 kg/30 min | Shall ensure a stable vapor pressure; heating temperature deviates within 5° C. |
|---|---|---|

6) Preparation of a Scratch-Resistant Coating Layer

After forming the above mentioned laminated floor body, the upper surface of the super-transparent wear-resistant layer was subjected to a surface polarizing treatment with the following treatment agents:

Formulation of treatment agent A (based on the weight of the total formulation):

| Turpentine (40 ml/L) | 35% |
|---|---|
| Ethyl acetate | 35% |
| Surfactant | 25% |
| Emulsifier | 5%; |

Formulation of treatment agent B (based on the weight of the total formulation):

| $KMnO_4$ | 0.5% |
|---|---|
| Deionized water | 99.5% |

The upper surface of the super-transparent wear-resistant layer was treated with treatment agent A at 50° C. for 3 minutes, and then was treated with treatment agent B for 1 minute and dried followed by a corona treatment.

A polyurethane-based coating was applied to the treated surface of the super-transparent wear-resistant layer to form a scratch-resistant coating layer.

Formulation of the polyurethane-based coating comprising (based on the weight of the total formulation):

| Chlorinated polypropylene (CAS 68442-33-1) | 10% |
|---|---|
| Polyurethane acrylate oligomer (XUF-6006W, Nippon Kayaku) | 40% |
| Acrylic monomer (CAS 79-10-7, BAMM company) | 35% |
| Photopolymerization initiator | 5% |
| silica matting agent | 10% |

7) Surface Treatment of the Bottom Connective Layer

After the hot press lamination, the bottom surface of the bottom connective layer was subjected to a surface polarizing treatment with the following treatment agents:

Formulation of treatment agent A comprising (based on the weight of the total formulation):

| Turpentine (40 ml/L) | 40% |
|---|---|
| Ethyl acetate | 40% |
| Surfactant | 15% |
| Emulsifier | 5% |

Formulation of treatment agent B comprising (based on the weight of the total formulation):

| $KMnO_4$ | 1% |
|---|---|
| Deionized water | 99% |

The bottom surface of the bottom connective layer was treated with treatment agent A at 50° C. for 5 minutes, and then was treated with treatment agent B for 3 minutes, and then dried.

From the above steps a composite floor of the present invention was prepared. The physical properties of the composite floor are shown in Table 13 below:

TABLE 13

| Physical property | Test standard | Standard value | Measured value |
|---|---|---|---|
| Residue recess | EN433 | ≤0.1 mm | 0.06 mm |
| High temperature warpage (80° C., 6 hours) | EN434 | ≤2.0 mm | 0.28 mm |
| Dimensional stability (%) | EN434 | ≤0.25% | 0.02% |
| Compactness (kgf/5 cm) | EN431 | ≥7.5 | 8.2 |
| Scratch resistance of the surface | EU standard | ≥2500 g | 2600 g |
| Flame retardance | EN13501-1 | Bfl-S1 | Bfl-S1 |

In addition, the lock performance of the composite floor of the present invention is excellent. For a known non-PVC floor, since its substrate layer is hard and brittle, it is difficult to apply a locking technology on a non-PVC floor to obtain a lock tension value of greater than 200 kg/m (EU customer standard). By optimizing the formulations and preparation processes of the component layers, the composite floor of the present invention overcomes the defect of the prior art and achieves a lock tension value of about 250 kg/m, and thus a polypropylene lock floor was successfully prepared.

The present invention has been specifically described above by way of embodiments and examples, however, the embodiments and examples are not intend to limit the scope of the invention, and those skilled in the art would understand that, on the basis of the present disclosure, one can make various changes to the composite flooring, and these changes are covered by the spirit and scope of the present invention.

What is claimed is:

1. A composite floor comprising, from top to bottom:
   1) a scratch-resistant coating layer, which is formed from a polyurethane-based coating;
   2) a super-transparent wear-resistant layer, which is formed from a raw material formulation comprising, based on the weight of the total formulation,
   85-98% by weight of a polypropylene having a molecular weight of 100,000 to 300,000,
   1-12% by weight of a grafted copolymer of propylene and maleic anhydride having a molecular weight of 20,000 to 50,000, wherein the grafting rate of maleic anhydride is 1-10%,
   0.2-0.8% by weight of a nucleating agent,
   0.1-0.5% by weight of an antioxidant,
   0.2-0.8% by weight of an ultraviolet light absorber, and
   0.2-0.5% by weight of a light stabilizer,
   wherein the super-transparent wear-resistant layer has a haze of less than 11% and a light transmittance of greater than 90%;
   3) a decorative layer, which is a layer of ink-printed environment-friendly composite paper or a layer formed through a thermal transfer process;
   4) a first substrate layer having a raw material formulation comprising, based on the weight of the total formulation,
   0.5-4.5% by weight of a first polypropylene homopolymer having a melt index of 0.1-0.35 g/10 min,
   0.5-4.5% by weight of a second polypropylene homopolymer having a melt index of 5-30 g/10 min,
   1-3% by weight of a polyethylene homopolymer having a melt index of 2-4 g/10 min,
   1-5% by weight of glass fiber with a length of 0.4-0.8 mm,
   0.5-2% by weight of an ethylene-octene copolymer,
   2-5% by weight of wollastonite powder,
   60-85% by weight of calcium carbonate powder, and
   1-6% by weight of an intumescent flame retardant;
   wherein, the first polypropylene homopolymer and the second polypropylene homopolymer form a polypropylene blend, and based on the total weight of the first substrate layer, the weight percentage of the polypropylene blend is represented by "wt % pp", the weight percentage of the polyethylene homopolymer is represented by "wt % pe", the average melt index of the polypropylene blend is represented by "MIpp", the melt index of the polyethylene homopolymer is represented by "MIpe", and $Rm=(MIpp \times wt\% pp)/(MIpe \times wt\% pe)$, then Rm satisfies 1<Rm<10;

5) a second substrate layer having a raw material formulation comprising, based on the weight of the total formulation,
   0.5-1.5% by weight of a first polypropylene homopolymer having a melt index of 0.1-0.35 g/10 min, and
   0.5-1.5% by weight of a second polypropylene homopolymer having a melt index of 5-30 g/10 min,
   9-10% by weight of a polyethylene homopolymer having a melt index of 2-4 g/10 min,
   1-5% by weight of glass fiber with a length of 0.4-0.8 mm,
   0.5-2% by weight of an ethylene-octene copolymer,
   2-5% by weight of wollastonite powder,
   60-85% by weight of calcium carbonate powder, and
   1-6% by weight of an intumescent flame retardant;
   wherein, the first polypropylene homopolymer and the second polypropylene homopolymer form a polypropylene blend, and based on the total weight of the second substrate layer, the weight percentage of the polypropylene blend is represented by "wt % pp", the weight percentage of the polyethylene homopolymer is represented by "wt % pe", the average melt index of the polypropylene blend is represented by "MIpp", the melt index of the polyethylene homopolymer is represented by "MIpe", and $Rm=(MIpp \times wt\% pp)/(MIpe \times wt\% pe)$, then Rm satisfies 0.2<Rm<1;

6) a bottom connective layer formed from a polypropylene-based material and having a rough surface formed by embossing,
   wherein the bottom connective layer has a raw material formulation comprising, based on the weight of the total formulation,
   85-98% by weight of a polypropylene homopolymer having a molecular weight of 100,000 to 300,000,
   1-12% by weight of a polypropylene-maleic anhydride grafted copolymer having a molecular weight of 20,000 to 50,000, wherein the grafting rate of the maleic anhydride is 1-10%,
   0.1-0.5% by weight of an antioxidant,
   0.2-0.5% by weight of an ultraviolet light absorber, and
   0.2-0.5% by weight of a light stabilizer;
   and optionally
   7) a back adhesive layer, which is a hot melt adhesive layer applied on the bottom surface of the bottom connective layer.

2. A composite floor according to claim 1, wherein the upper surface of the super-transparent wear-resistant layer has been subjected to a surface-polarizing treatment.

3. A composite floor according to claim 2, wherein the upper surface of the ultra-transparent wear-resistant layer has been subjected to a surface-polarizing treatment by using the following treatment agent A and treatment agent B:
   treatment agent A comprising:
      20-40% by weight of turpentine,
      20-40% by weight of ethyl acetate,
      20-30% by weight of a surfactant, and
      2-10% by weight of an emulsifier;
   treatment agent B comprising:
      0.5-1% by weight of KMnO$_4$, and
      99-99.5% by weight of deionized water.

4. A composite floor according to claim 1, wherein the decorative layer is an ink-printed silicon-based environment-friendly composite paper, and the composite paper has a raw material formulation comprising: based on the weight of the total formulation, 10-30% by weight of silicon-based nano powder with a particle diameter of 10-100 nm;
1-5% by weight of a polyelectrolyte dispersant,
20-25% by weight of a polyethylene having a molecular weight of about 100,000 to 300.000,
10-20% by weight of a polypropylene having a molecular weight of about 200,000-400,000,
40-50% by weight of an inorganic mineral powder filler,
1-3% by weight of a lubricant, and
1-2% by weight of an antistatic agent.

5. A composite floor according to claim 1, wherein the bottom surface of the bottom connective layer is subjected to a surface-polarizing treatment.

6. A composite floor according to claim 5, wherein the bottom surface of the bottom connective layer is subjected to a surface-polarizing treatment by using the following treatment agent A and treatment agent B:
treatment agent A comprising:
10-40% by weight of turpentine,
10-40% by weight of ethyl acetate,
10-20% by weight of a surfactant, and
2-10% by weight of an emulsifier;
treatment agent B comprising:
0.5-1% by weight of $KMnO_4$, and
99-99.5% by weight of deionized water.

7. A process for preparing a composite floor according to claim 1, comprising the following steps:
1) preparing a first substrate layer: mixing raw materials for forming a first substrate layer together, subjecting the mixture to internal milling, open milling, calendering and cooling steps to prepare a first substrate layer;
2) preparing a second substrate layer mixing raw materials for forming a second substrate layer together, subjecting the mixture to internal milling, open milling, calendering and cooling steps to prepare a second substrate layer;
3) Preparing a super-transparent wear-resistant layer: adding raw materials for forming a super-transparent wear-resistant layer into a planetary twin-screw extruder, kneading and extruding the raw materials, feeding the extruded mixture into a calenderer and rapidly cooling the calendered sheet to obtain a super-transparent wear-resistant layer, which has a haze of 8-11% and a light transmittance of 90-95%;
4) Preparing a decorative layer: applying a decorative layer to the upper surface of the first substrate layer or to the bottom surface of the super-transparent wear-resistant layer through a thermal transfer method, or by using an ink-printed environment-friendly composite paper;
5) Preparing a bottom connective layer extruding raw materials for forming a bottom connective layer into a sheet, subjecting the extruded sheet to an embossing process to form a rough surface having embossed pattern thereon;
6) forming a laminated floor body comprising the super-transparent wear-resistant layer, the decorative layer, the first substrate layer, the second substrate layer, and the bottom connective layer obtained above in this order by a hot press lamination process, and optionally, the embossing process of the bottom connective layer is carried out simultaneously with the hot press lamination process;
7) preparing a scratch-resistant coating layer: applying a polyurethane-based coating onto the upper surface of the super-transparent wear-resistant layer of the laminated floor body obtained by the above described hot press lamination process to form a scratch-resistant coating layer, and optionally,
8) preparing a back adhesive layer: applying a hot melt adhesive to the bottom surface of the bottom connective layer by an adhesive applier.

8. A process according to claim 7, wherein the upper surface of the super-transparent wear-resistant layer is subjected to a surface polarizing treatment before applying the scratch-resistant coating layer onto it.

9. A process according to claim 8, wherein the upper surface of the super-transparent wear-resistant layer is subjected to a surface-polarizing treatment by using the following treatment agent A and treatment agent B:
treatment agent A comprising:
20-40% by weight of turpentine,
20-40% by weight of ethyl acetate,
20-30% by weight of a surfactant, and
2-10% by weight of an emulsifier;
treatment agent B comprising:
0.5-1% by weight of $KMnO_4$, and
99-99.5% by weight of deionized water.

10. A process according to claim 7, wherein the bottom surface having embossed pattern thereon of the bottom connective layer is subjected to a surface-polarizing process.

11. A process according to claim 10, wherein the bottom surface having embossed pattern thereon of the bottom connective layer is subjected to a surface-polarizing process by using the following treatment agent A and treatment agent B:
treatment agent A comprising:
10-40% by weight of turpentine,
10-40% by weight of ethyl acetate,
10-20% by weight of a surfactant, and
2-10% by weight of an emulsifier;
treatment agent B comprising:
0.5-1% by weight of $KMnO_4$, and
99-99.5% by weight of deionized water.

12. A process according to claim 7, wherein the decorative layer is formed onto the upper surface of the first substrate layer or the bottom surface of the super-transparent wear-resistant layer by a thermal transfer process with following process parameters:

| | |
|---|---|
| hardness of the substrate surface | 60°-90° |
| preheated temperature of surface hot air knife | 50-60° C. |
| traction speed | 2-4 m/min |
| transfer temperature | 300-370° C. |
| transfer pressure | 0.4-0.5 Mpa |
| transfer thickness | 12-26 µm. |

13. A process according to claim 7, wherein each of the first substrate layer and the second substrate layer is prepared by the following steps: mixing raw materials for the substrate layer in a mixer with a stir speed of 5000-8000 rpm, internal milling the mixture in an internal mill at a temperature of 100-190° C., further open milling the mixture in a roller mill at a temperature of 120-190° C. transferring the mixed and milled raw materials into a calenderer and calendering them at a temperature of 150-180° C., and then cooling the calendered sheet to obtain a substrate layer.

14. A process according to claim 7, wherein the super-transparent wear-resistant layer is prepared by the following steps: mixing and extruding raw materials of the super-transparent wear-resistant layer in a planetary twin-screw extruder at a plasticizing temperature of 170-220° C.; calendering the extruded materials in a calenderer at a temperature of 150-185° C., and finally cooling the calendered sheet with a set of cooling wheels at a temperature of 50-60° C. and a line speed of 40-100 m/min.

15. A composite floor prepared by a process according to claim 7.

16. A composite floor prepared by a process according to claim 9.

* * * * *